United States Patent [19]
Bruso et al.

[11] Patent Number: 5,649,214
[45] Date of Patent: Jul. 15, 1997

[54] METHOD AND APPARATUS FOR CONTINUED USE OF DATA ENCODED UNDER A FIRST CODED CHARACTER SET WHILE DATA IS GRADUALLY TRANSLITERATED TO A SECOND CODED CHARACTER SET

[75] Inventors: Kelsey L. Bruso, Minneapolis; Robert Dean Vavra, Roseville, both of Minn.

[73] Assignee: Unisys Corporation, Blue Bell, Pa.

[21] Appl. No.: 309,995

[22] Filed: Sep. 20, 1994

[51] Int. Cl.⁶ .................................................. G06F 17/21
[52] U.S. Cl. ...................................... 395/758; 395/785
[58] Field of Search ...................... 364/419.02, 419.03, 364/419.05, 419.1, 419.11, 419.12, 419.14, 419.16; 395/600, 752, 753, 755, 761, 794, 795, 803, 798

[56] References Cited

U.S. PATENT DOCUMENTS

| | | | |
|---|---|---|---|
| 4,703,322 | 10/1987 | Goss et al. | 340/750 |
| 5,389,924 | 2/1995 | Ogawa | 341/106 |

*Primary Examiner*—Gail O. Hayes
*Assistant Examiner*—Steven R. Yount
*Attorney, Agent, or Firm*—Charles A. Johnson; Mark T. Starr

[57] ABSTRACT

This disclosure relates to a computer implemented method that allows continued use of data files containing data encoded in a first coded character set while the data is gradually transliterated to a second coded character set. An intermediate coded character set is created that includes the required character symbols and associated character codes of the first coded character set and the corresponding pairs of character symbols and character codes from the second coded character set. The intermediate coded character set facilitates continued access to the data files which, during the process of gradual migration, will contain first coded character set character codes and second coded character set character codes. The intermediate coded character set further allows application software to selectively transliterate data encoded under the first coded character set to second coded character set character codes. Character codes may also be transliterated from the second coded character set to the first coded character set.

14 Claims, 10 Drawing Sheets

| Octal Code | Character Symbol |
|---|---|
| 40 | <space> |
| 41 | ! |
| 42 | " |
| 43 | # |
| 44 | $ |
| 45 | % |
| 46 | & |
| 47 | ' |
| 50 | ( |
| 51 | ) |
| 52 | * |
| 53 | + |
| 54 | , |
| 55 | - |
| 56 | . |
| 57 | / |
| 60 | 0 |
| 61 | 1 |
| 62 | 2 |
| 63 | 3 |
| 64 | 4 |
| 65 | 5 |
| 66 | 6 |
| 67 | 7 |
| 70 | 8 |
| 71 | 9 |
| 72 | : |
| 73 | ; |
| 74 | < |
| 75 | = |
| 76 | > |
| 77 | ? |

| Octal Code | Character Symbol |
|---|---|
| 100 | § |
| 101 | A |
| 102 | B |
| 103 | C |
| 104 | D |
| 105 | E |
| 106 | F |
| 107 | G |
| 110 | H |
| 111 | I |
| 112 | J |
| 113 | K |
| 114 | L |
| 115 | M |
| 116 | N |
| 117 | O |
| 120 | P |
| 121 | Q |
| 122 | R |
| 123 | S |
| 124 | T |
| 125 | U |
| 126 | V |
| 127 | W |
| 130 | X |
| 131 | Y |
| 132 | Z |
| 133 | Ä |
| 134 | Ö |
| 135 | Ü |
| 136 | ^ |
| 137 | _ |

| Octal Code | Graphic Symbol |
|---|---|
| 140 | ` |
| 141 | a |
| 142 | b |
| 143 | c |
| 144 | d |
| 145 | e |
| 146 | f |
| 147 | g |
| 150 | h |
| 151 | i |
| 152 | j |
| 153 | k |
| 154 | l |
| 155 | m |
| 156 | n |
| 157 | o |
| 160 | p |
| 161 | q |
| 162 | r |
| 163 | s |
| 164 | t |
| 165 | u |
| 166 | v |
| 167 | w |
| 170 | x |
| 171 | y |
| 172 | z |
| 173 | ä |
| 174 | ö |
| 175 | ü |
| 176 | ß |

FIG. 2

| Octal Code | Character Symbol |
|---|---|
| 40 | <space> |
| 41 | ! |
| 42 | " |
| 43 | # |
| 44 | $ |
| 45 | % |
| 46 | & |
| 47 | ' |
| 50 | ( |
| 51 | ) |
| 52 | * |
| 53 | + |
| 54 | , |
| 55 | - |
| 56 | . |
| 57 | / |
| 60 | 0 |
| 61 | 1 |
| 62 | 2 |
| 63 | 3 |
| 64 | 4 |
| 65 | 5 |
| 66 | 6 |
| 67 | 7 |
| 70 | 8 |
| 71 | 9 |
| 72 | : |
| 73 | ; |
| 74 | < |
| 75 | = |
| 76 | > |
| 77 | ? |
| 100 | @ |
| 101 | A |
| 102 | B |
| 103 | C |
| 104 | D |
| 105 | E |
| 106 | F |
| 107 | G |
| 110 | H |
| 111 | I |

| Octal Code | Character Symbol |
|---|---|
| 112 | J |
| 113 | K |
| 114 | L |
| 115 | M |
| 116 | N |
| 117 | O |
| 120 | P |
| 121 | Q |
| 122 | R |
| 123 | S |
| 124 | T |
| 125 | U |
| 126 | V |
| 127 | W |
| 130 | X |
| 131 | Y |
| 132 | Z |
| 133 | [ |
| 134 | \ |
| 135 | ] |
| 136 | ^ |
| 137 | _ |
| 140 | ` |
| 141 | a |
| 142 | b |
| 143 | c |
| 144 | d |
| 145 | e |
| 146 | f |
| 147 | g |
| 150 | h |
| 151 | i |
| 152 | j |
| 153 | k |
| 154 | l |
| 155 | m |
| 156 | n |
| 157 | o |
| 160 | p |
| 161 | q |
| 162 | r |
| 163 | s |

| Octal Code | Character Symbol |
|---|---|
| 164 | t |
| 165 | u |
| 166 | v |
| 167 | w |
| 170 | x |
| 171 | y |
| 172 | z |
| 173 | { |
| 174 | \| |
| 175 | } |
| 176 | ~ |
| 241 | ¡ |
| 242 | ¢ |
| 243 | £ |
| 244 | ¤ |
| 245 | ¥ |
| 246 | ¦ |
| 247 | § |
| 250 | ¨ |
| 251 | © |
| 252 | ª |
| 253 | « |
| 254 | ¬ |
| 255 | - |
| 256 | ® |
| 257 | ¯ |
| 260 | ° |
| 261 | ± |
| 262 | ² |
| 263 | ³ |
| 264 | ´ |
| 265 | µ |
| 266 | ¶ |
| 267 | · |
| 270 | ¸ |
| 271 | ¹ |
| 272 | º |
| 273 | » |
| 274 | ¼ |
| 275 | ½ |
| 276 | ¾ |
| 277 | ¿ |

FIG. 3A

| Octal Code | Character Symbol |
|---|---|
| 300 | À |
| 301 | Á |
| 302 | Â |
| 303 | Ã |
| 304 | Ä |
| 305 | Å |
| 306 | Æ |
| 307 | Ç |
| 310 | È |
| 311 | É |
| 312 | Ê |
| 313 | Ë |
| 314 | Ì |
| 315 | Í |
| 316 | Î |
| 317 | Ï |
| 320 | Ð |
| 321 | Ñ |
| 322 | Ò |
| 323 | Ó |
| 324 | Ô |

| Octal Code | Character Symbol |
|---|---|
| 325 | Õ |
| 326 | Ö |
| 327 | × |
| 330 | Ø |
| 331 | Ù |
| 332 | Ú |
| 333 | Û |
| 334 | Ü |
| 335 | Ý |
| 336 | Þ |
| 337 | ß |
| 340 | à |
| 341 | á |
| 342 | â |
| 343 | ã |
| 344 | ä |
| 345 | å |
| 346 | æ |
| 347 | ç |
| 350 | è |
| 351 | é |

| Octal Code | Character Symbol |
|---|---|
| 352 | ê |
| 353 | ë |
| 354 | ì |
| 355 | í |
| 356 | î |
| 357 | ï |
| 360 | ð |
| 361 | ñ |
| 362 | ò |
| 363 | ó |
| 364 | ô |
| 365 | õ |
| 366 | ö |
| 367 | ÷ |
| 370 | ø |
| 371 | ù |
| 372 | ú |
| 373 | û |
| 374 | ü |
| 375 | ý |
| 376 | þ |
| 377 | ÿ |

FIG. 3B

| Octal Code | Character Symbol |
|---|---|
| 40 | <space> |
| 41 | ! |
| 42 | " |
| 43 | # |
| 44 | $ |
| 45 | % |
| 46 | & |
| 47 | ' |
| 50 | ( |
| 51 | ) |
| 52 | * |
| 53 | + |
| 54 | , |
| 55 | - |
| 56 | . |
| 57 | / |
| 60 | 0 |
| 61 | 1 |
| 62 | 2 |
| 63 | 3 |
| 64 | 4 |
| 65 | 5 |
| 66 | 6 |
| 67 | 7 |
| 70 | 8 |
| 71 | 9 |
| 72 | : |
| 73 | ; |
| 74 | < |
| 75 | = |
| 76 | > |
| 77 | ? |
| 100 | @ |
| 101 | A |
| 102 | B |
| 103 | C |
| 104 | D |
| 105 | E |
| 106 | F |
| 107 | G |

| Octal Code | Character Symbol |
|---|---|
| 110 | H |
| 111 | I |
| 112 | J |
| 113 | K |
| 114 | L |
| 115 | M |
| 116 | N |
| 117 | O |
| 120 | P |
| 121 | Q |
| 122 | R |
| 123 | S |
| 124 | T |
| 125 | U |
| 126 | V |
| 127 | W |
| 130 | X |
| 131 | Y |
| 132 | Z |
| 133 | Ä |
| 134 | Ö |
| 135 | Ü |
| 136 | ^ |
| 137 | _ |
| 140 | ` |
| 141 | a |
| 142 | b |
| 143 | c |
| 144 | d |
| 145 | e |
| 146 | f |
| 147 | g |
| 150 | h |
| 151 | i |
| 152 | j |
| 153 | k |
| 154 | l |
| 155 | m |
| 156 | n |
| 157 | o |
| 160 | p |

| Octal Code | Character Symbol |
|---|---|
| 161 | q |
| 162 | r |
| 163 | s |
| 164 | t |
| 165 | u |
| 166 | v |
| 167 | w |
| 170 | x |
| 171 | y |
| 172 | z |
| 173 | ä |
| 174 | ö |
| 175 | ü |
| 176 | ß |
| 304 | Ä |
| 326 | Ö |
| 334 | Ü |
| 337 | ß |
| 344 | ä |
| 366 | ö |
| 374 | ü |

FIG. 5

| Source character codes | Destination character code | Character symbol |
|---|---|---|
| $40_8$ | $40_8$ | <space> |
| $41_8$ | $41_8$ | ! |
| $42_8$ | $42_8$ | " |
| . | . | . |
| . | . | . |
| . | . | . |
| $132_8$ | $132_8$ | Z |
| $133_8$ | $304_8$ | Ä |
| $134_8$ | $326_8$ | Ö |
| $135_8$ | $334_8$ | Ü |
| $136_8$ | $136_8$ | ^ |
| . | . | . |
| . | . | . |
| . | . | . |
| $163_8$ | $163_8$ | s |
| . | . | . |
| . | . | . |
| . | . | . |
| $172_8$ | $172_8$ | z |
| $173_8$ | $344_8$ | ä |
| $174_8$ | $366_8$ | ö |
| $175_8$ | $374_8$ | ü |
| $176_8$ | $337_8$ | ß |

FIG. 6

METHOD AND APPARATUS FOR CONTINUED USE OF DATA ENCODED UNDER A FIRST CODED CHARACTER SET WHILE DATA IS GRADUALLY TRANSLITERATED TO A SECOND CODED CHARACTER SET

BACKGROUND OF THE INVENTION

1. Field of the Invention

This invention generally relates to coded character sets and more particularly to the problem faced by computer system users who have data encoded in a first coded character set and are required to migrate the data to a second coded character set.

2. Description of the Prior Art

As more of the non-English speaking world comes to rely on the automation and information processing power of computer technology, computer system providers can no longer assume that the end-user of a system will be fluent in English or in a language which can be transliterated into the English alphabet.

European governments are increasingly requiring that information in databases be represented with the character symbols for the language for that country. For example, it is becoming unacceptable to use the English characters "ue" in a data base or file to represent the German character "ü" or to force the use of "ss" to represent the character "β".

As a result of these government requirements and changes in user expectations, computer manufacturers are now required to support coded character sets that contain more than the standard English language characters. The most common extended crated character set is the "Latin-1" coded character set which is represented using the International Organization for Standardization (ISO) coded character set ISO-8859.1.

The ASCII coded character set has been in use in many American-made computers for several decades. It is a character encoding which uses 7-bits to represent 95 graphical characters:

```
<space> ! " # $ % & ' ( ) * + , - . / 0 1 2 3 4 5 6 7 8 9
: ; < = > ? @ A B C D E F G H I J K L M N O P Q
R S T U V W X Y Z [ \ ] ^ _ a b c d e f g h i j k l m
n o p q r s t u v w x y z { | } ~
```

The Latin-1 coded character set uses 8-bits to represent 191 graphical characters:

```
<space> ! " # $ % & ' ( ) * + , - . / 0 1 2 3 4 5 6 7 8 9
: ; < = > ? @ A B C D E F G H I J K L M N O P Q
R S T U V W X Y Z [ \ ]^ _ a b c d e f g h i j k l m n
o p q r s t u v w x y z { | } ~ ¡ ¢ £ ¤ ¥ ¦ § © ª « ¬ -
® ¯ ±²³´ µ ¶ ¸ ¹º » ¼ ½ ¾ ¿ À Á Â Ã Ä Å
Æ Ç È É Ê Ë Ì Í Î Ï Ð Ñ Ò Ó Ô Õ Ö × Ø Ù Ú Û
Ü Ý Þ β à á â ã ä å æ ç è é ê ë ì í î ï ð ñ ò ó ô õ
ö ÷ ø ù ú û ü ý þ ÿ
```

The International Organization for Standardization (ISO) has standardized several coded character sets. The most widely used 7-bit sets are the ISO 646 family of coded character sets listed below:
ISO 646 US
ISO 646 UK
ISO 646 France
ISO 646 Germany
ISO 646 Italy
ISO 646 Spain
ISO 646 Sweden
ISO 646 Denmark
ISO 646 Norway The ISO 646 family of coded character sets have "National Replacement Characters". For example, in ISO 646 Germany, the code which, in ASCII (ISO 646 US), represents "]" instead represents "Ü" and the code which, in ASCII, represents "}" instead represents "ü". The characters "]" and "}" cannot be represented at all using the ISO 646 Germany coded character set.

The most widely used 8-bit sets are the ISO 8859.n family of character sets:
ISO 8859.1 Latin Alphabet No. 1
ISO 8859.2 Latin Alphabet No. 2
ISO 8859.3 Latin Alphabet No. 3
ISO 8859.4 Latin Alphabet No. 4
ISO 8859.5 Latin/Cyrillic
ISO 8859.6 Latin/Arabic
ISO 8859.7 Latin/Greek
ISO 8859.8 Latin/Hebrew
ISO 8859.9 Latin Alphabet No. 5
ISO 8859.10 Box drawing set The general problem faced by a computer system user having data encoded in a first coded character set and facing the requirement to migrate to a second coded character set may be exemplified as follows: Suppose a user has a large database file containing data encoded using an ISO 646 variant. If that user wants to begin using an ISO 8859.n character set for the encoding, the only choice available today is to make the database file unavailable, unload, transliterate (i.e., convert character codes from ISO 646 to ISO 8859.n), and reload the data, and then make the database file available again.

Many computer system users cannot allow critical database files to be unavailable for even a brief period of time. The database may be the heart of their business—for example in an on-line transaction processing environment such as an airline reservation system. Thus, these users require a way to convert their computer systems and software to use a new coded character set that does not severely impact their day-to-day business operations.

SUMMARY OF THE INVENTION

Therefore, it would be desirable to have the ability to gradually migrate data from an existing first coded character set to a desired second coded character set, and at the same time provide for continued system availability.

It is an object of the invention to provide continued availability of data encoded in a first coded character set while the data is gradually encoded in a second coded character set.

A further object is to create an intermediate coded character set to permit continued use of data encoded in a first coded character set while gradually migrating to a second coded character set.

Yet another object is to selectively convert character codes from the first coded character set to the second coded character set and from the second coded character set to the first coded character set.

According to the present invention, the foregoing and other objects and advantages are attained in a computer system that includes a data processing system for executing application software, input/output hardware devices for providing input to and receiving output from the application software, and data storage hardware in which a data file that contains character codes is stored. At the outset of the process of gradual migration, all the character codes in the data file are encoded under the first coded character set or "Source" coded character set. During the process of gradual migration, one or more of the input/output devices support input and/or output of data encoded under a second coded character set, or the "Destination" coded character set. Support software is responsive to requests from the application software to selectively transliterate character codes between the first and second coded character sets.

The character code converter uses an intermediate coded character set to support the gradual migration to the second coded character set. The intermediate coded character set contains the required character code/character symbol pairs from the first coded character set and character code/character symbol pairs from the second coded character set for which the character symbols are defined in the first coded character set and have different character codes in the first coded character set. The required character code/character symbol pairs from the first coded character set are those used to represent data in the data file. The character code/character symbol pairs in the intermediate coded character set for which the character symbol has two different character codes are designated as either coming from the first coded character set if the pair is from the first, or coming from the second coded character set if the pair came from the second.

After the application software begins operating with the intermediate coded character set, the application software remains fully operational with the existing data file. As the application software receives character codes that are encoded under the second coded character set and are to be written to the data file, the second coded character set character codes are written, without change, to the data file. Therefore, during the process of gradual migration, the intermediate coded character set contains character codes encoded under the first coded character set and character codes encoded under the second coded character set. Usage of the intermediate coded character set allows the application software to remain fully operational while the data file contains both first and second coded character set character codes. As time passes and more second coded character set character codes are written to the data file, the data file will eventually contain only character codes encoded under the second coded character set.

Through the interim period during which the data file contains character codes encoded under the first coded character set and character codes encoded under the second coded character set, the application software reads character codes from the data file and from input hardware. The character codes may be encoded under either the first or second coded character set. The application software selects a coded character set for the output of character codes based on the hardware to which the data is to be output. If the input character codes are to be provided as output and the coded character set of the output is different from the coded character set of the input character codes, the input character codes are transliterated to the selected coded character set by the support software. The application software may then provide the character codes as output.

Still other objects and advantages of the present invention will become readily apparent to those skilled in the art from the following detailed description, wherein only the preferred embodiment of the invention is shown, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

FIG. 2 is a table of the ISO 646 German Coded Character Set;

FIGS. 3A and 3B comprise a table of the ISO 8859.1 Coded Character Set:

FIG. 5 is a table of and exemplary Intermediate Coded Character Set for converting between the ISO 646 German Coded Character Set and the ISO 8859.1 Coded Character Set:

FIG. 6 is an exemplary Form Map Table that is used in converting character codes between the ISO 646 German Coded Character Set and the ISO 8859.1 Coded Character Set;

DESCRIPTION OF THE PREFERRED EMBODIMENT

The present invention may be understood by way of the example described in the following paragraphs along with the accompanying figures. The example illustrates the process of gradually migrating data from the ISO 646 German Coded Character Set, which is referred to as the "Source" Coded Character Set, to the ISO 8859.1 Coded Character Set, which is referred to as the "Destination" Coded Character Set.

Figure 1:
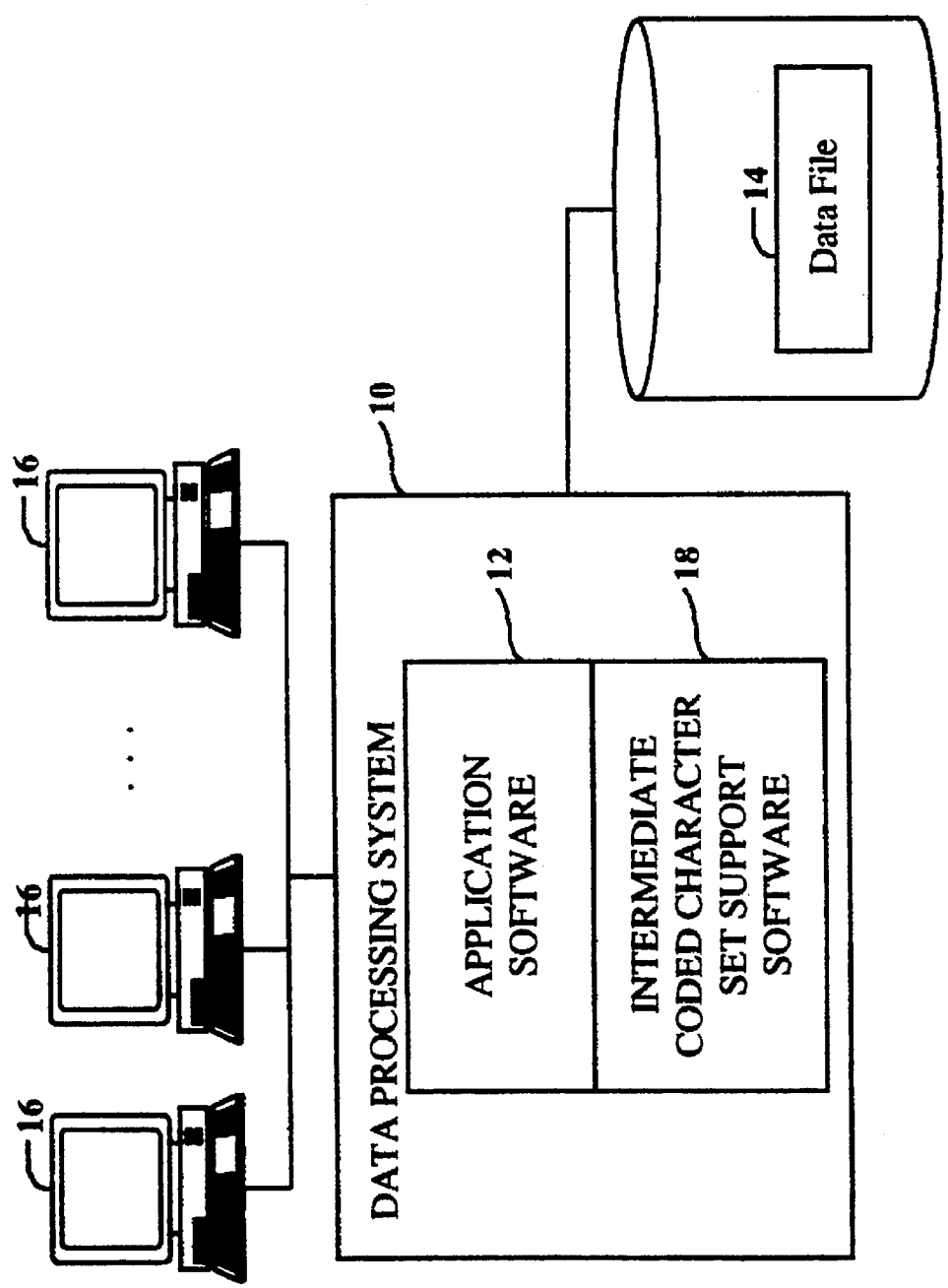
FIG. 1 is a functional block diagram that illustrates exemplary hardware, software, and data components for gradually migrating from a Source Coded Character Set to a Destination Coded Character Set.

FIG. 1 is a functional block diagram that illustrates exemplary hardware, software, and data components for gradually migrating from a Source Coded Character Set to a Destination Coded Character Set. The Data Processing System 10 could be a general purpose data processing system such as the 2200/500 Series data processing system that is commercially available from Unisys Corporation. The System 10 would include Application Software 12 and support software to provide access to a Data File 14. An exemplary Application might be an airline reservation system which has the Data File encoded in a Source Coded Character Set, e.g., the ISO 646 German Coded Character Set.

One or more Video Display Terminals 16 are linked to the System 10 to allow users to input data and display output data. A scenario under which a user might opt to gradually convert character codes in the Data File 14 would be where a user is upgrading the Terminals or deploying Personal Computers and implementing new applications under a client/server architecture. The scheme by which a user ultimately ends up with a Data File which is totally comprised of character codes from the Destination Character Set is highly dependent upon the nature of the Application Software 12. For example, while the Application Software is performing its user visible functions, it could also be converting character codes in the Data File to the Destination Coded Character Set. The time required to complete this gradual migration depends upon the size of the Data File and the activity level in response to user requests.

The Intermediate Coded Character Set Support Software 18 supports the gradual migration of character codes in the Data File 14 from the Source Coded Character Set to the Destination Coded Character Set. In the time period during which character codes are gradually migrated to the Destination Coded Character Set and through usage of the Intermediate Coded Character Set, the Data File may include character codes from both the Source Coded Character Set and the Destination Coded Character Set. Therefore, it is possible that a character symbol may be represented in the Data File by two different character codes. The Intermediate Coded Character Set Support Software resolves the apparent ambiguity. In addition, the Intermediate Coded Character Set Support Software allows Application Software 12 to continue to use the Data File 14 in combination with any of the Terminals 16 (or other hardware) which support the Destination Coded Character Set as well as Terminals which support the Source Coded Character Set.

FIG. 2 is a table of the ISO 646 German Coded Character Set. The columns on the left contain the octal character codes which represent the associated character symbols contained in the columns on the right. For example, the character symbol "Ä" is represented by the octal character code 133.

FIGS. 3A and 3B comprise a table of the ISO 8859.1 Coded Character Set. Note that in contrast to the ISO 646 German Coded Character Set, the octal code 133 in the ISO 8859.1 Coded Character Set represents the character symbol "]", and "Ä" is represented by the octal code 304.

Figure 4:
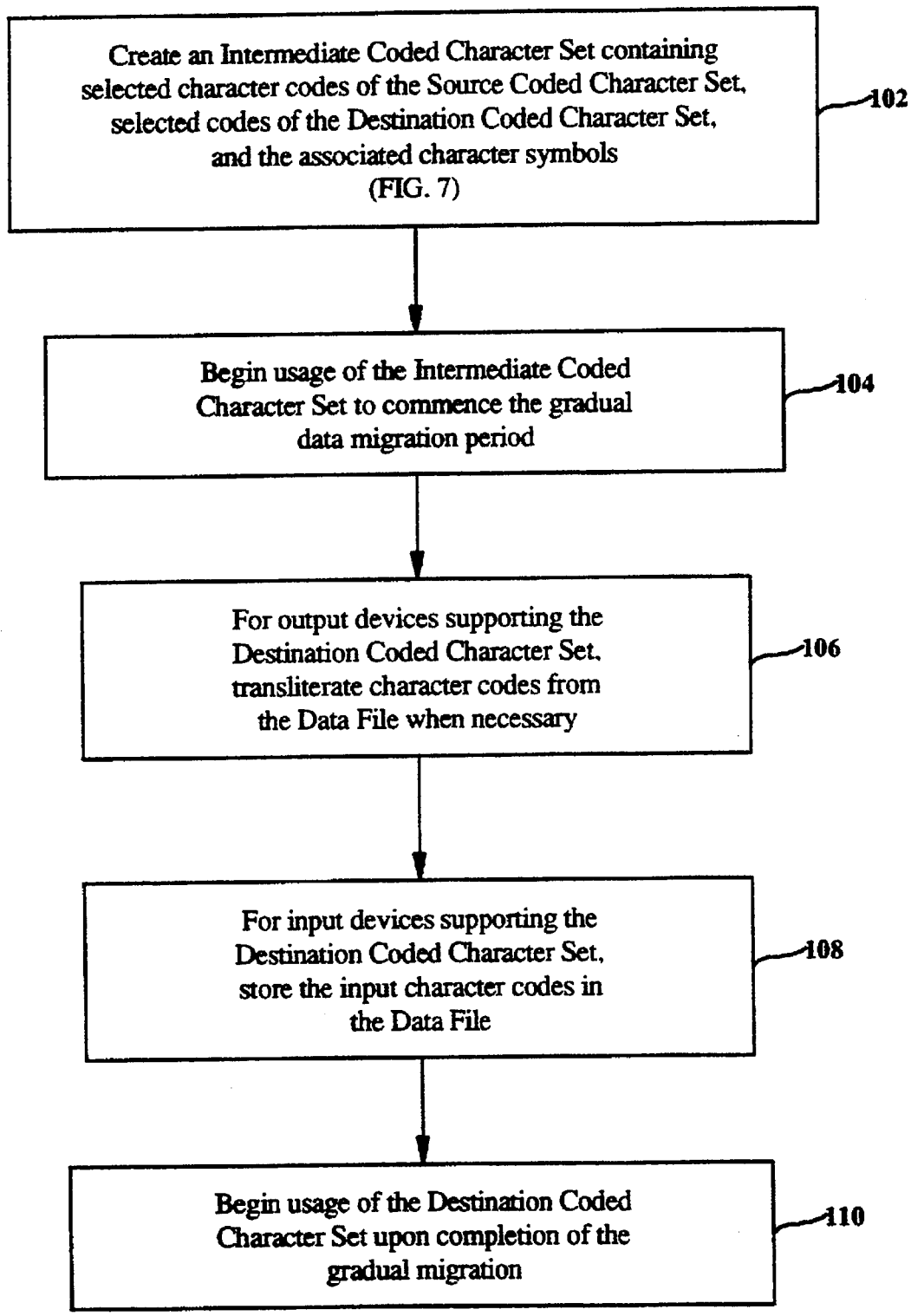
FIG. 4 is a flowchart of the general processing steps for gradually migrating character codes from a Source Coded Character Set to a Destination Coded Character Set.

FIG. 4 is a flowchart of the general processing steps for gradually migrating character codes from a Source Coded Character Set to a Destination Coded Character Set. The first step is to create an Intermediate Coded Character Set as shown by Step 102. Included in the Intermediate Coded Character Set are selected character codes from the Source Coded Character Set, selected character codes from the Destination Coded Character Set, and the character symbols which are associated with each of the respective character codes. The decision as to which coded character set, e.g., ISO 646 Germany, to use as the Source Coded Character Set is made based upon user requirements. If a user has existing data encoded in the ISO 646 German Coded Character Set and desires to gradually migrate to equipment which supports ISO 8859.1, then ISO 646 German would be the chosen Source Coded Character Set and ISO 8859.1 would be the Destination Coded Character Set.

The Destination Coded Character Set must contain all the symbols of interest in the Source Coded Character Set to create an Intermediate Coded Character Set. The Destination Coded Character Set may contain character symbols that are not in the Source Coded Character Set, and the additional symbols may be included in the Intermediate Coded Character Set if their inclusion would not result in a single character code in the Intermediate Coded Character Set representing two symbols.

In selecting which character codes to include in the Intermediate Coded Character Set, the differences between the Source and Destination Coded Character Sets must be identified and considered. For gradually migrating character codes from the ISO 646 German Coded Character Set to the ISO 8859.1 Coded Character Set, note that for octal codes less than or equal to $177_8$, the character symbols which are represented by different octal codes are:

| ISO 646 | § | Ä | Ö | Ü | ä | ö | ü | ß |
|---|---|---|---|---|---|---|---|---|
| ISO 8859.1 | @ | [ | \ | ] | { | | | } | ~ |

For character codes whose associated character symbols do not match, the alphabetic characters symbols are chosen instead of the non-alphabetic character symbols. If the present invention is used primarily to support the correct representation of people and place names, the § character may be ignored. If use of the invention required encoding the "§" character symbol, then a mapping for the character from the ISO 646 character set to the ISO 8859.1 character set would be required. Thus, the character symbols:

Ä Ö Ü ä ö ü ß are included in the Intermediate Coded Character Set. The Intermediate Coded Character Set contains each of these character symbols with two different character codes, the ISO 646 Germany character code and the ISO 8859.1 character code.

FIG. 5 is a table of an exemplary Intermediate Coded Character Set for gradually migrating character codes from the ISO 646 German Coded Character Set to the ISO 8859.1 Coded Character Set. Note that the characters Ä, Ö, Ü, ä, ö, ü, and ß appear twice, each time with a different octal character code. In particular, "Ä" is represented by octal character codes 133 and 304, "Ö" is represented by octal character codes 134 and 326, "Ü" is represented by octal character codes 135 and 334, "ä" is represented by octal character codes 173 and 344, "ö" is represented by octal character codes 174 and 366, "ü" is represented by octal character codes 175 and 374, and "ß" is represented by octal character codes 176 and 337. The Intermediate Coded Character Set and associated Intermediate Coded Character Set Support Software 18 allows the Data File to contain each of the foregoing character codes and provides continued access to the Data File for the Application Software 12.

The character symbols present in the Destination Coded Character Set that are not present in the Source Coded Character Set have not been included in the exemplary Intermediate Coded Character Set. However, the extra character symbols in the Destination Coded Character Set could have been included in the exemplary Intermediate Coded Character Set but were not included so as to keep the example simple.

The Intermediate Coded Character Set is constructed this way so that character strings stored in the Data File 14 are valid whether they were encoded in the Source Coded Character Set or the Destination Coded Character Set. For example, the character string "süß" could be encoded in the Data File as:

163 175 176 using the ISO 646 German character codes in the Intermediate Coded Character Set, 163 374 337 using the ISO 8859.1 codes in the Intermediate Coded Character Set, or 163 374 176 using some ISO 646 German character codes and using some ISO 8859.1 character codes in the Intermediate Coded Character Set.

Returning to the processing of FIG. 4, Step 104 provides for beginning usage of the Intermediate Coded Character Set by the Data Processing System 10. The Application Software 12 in combination with the Intermediate Coded Character Set Support Software 18 may commence processing of character codes using the Intermediate Coded Character Set after Step 102. To begin usage of the Intermediate Coded Character Set, the Application Software should be modified to selectively invoke the Intermediate Coded Character Set Support Software. The Support Software 18 uses the Intermediate Coded Character Set to provide the character code encoded under the desired coded character set. For example, if the Application Software is reading character codes from the Data File which are to be output to a Terminal 16 that supports the Destination Coded Character Set, the Application Software invokes the Support Software 18 to provide all character codes read from the Data File in the encoding of the Destination Coded Character Set.

A time period begins at Step 104 during which the character codes in the Data File 14 are gradually migrated to the Destination Coded Character Set. A step in the gradual character code migration process is to receive, as input, character codes encoded under the Destination Coded Character Set (e.g., ISO 8859.1 character codes from Terminal 16) and store them without change in the Data File. In this manner, the Data File is gradually populated with character codes encoded under the Destination Coded Character Set. During the character code migration time period, the Data File will contain character codes from both the Source Coded Character Set and the Destination Coded Character Set. As time passes and as more Destination Coded Character Set character codes are input and stored in the Data File, a larger portion of the Data File is populated with Destination Coded Character Set character codes. Eventually, the Data File will contain only Destination Coded Character Set character codes.

Step 106 provides character codes that are read from the Data File 14 in the desired coded character set. Specifically, if character codes are read from the Data File 14 and are to be provided to an output device which supports the Destination Coded Character Set (e.g., a Terminal 16 which supports the ISO 8859.1 coded character set), the Application Software 12 invokes the Intermediate Coded Character Set Support Software 18 to provide the character codes read from the Data File in the Destination Coded Character Set encoding. The Intermediate Coded Character Set Support Software changes the encoding, or "transliterates," of the character codes to the Destination Coded Character Set. The Intermediate Coded Character Set contains the Destination Coded Character Set representation.

Character codes that are input for storage in the Data File 14 and that are encoded under the Destination Coded Character Set are stored without change in the Data File at Step 108. This results in the Data File 14 gradually becoming populated with Destination Coded Character Set character codes.

Through the time period during which the character codes in the Data File 14 are gradually migrated to the Destination Coded Character Set, the Data File may contain Destination Coded Character Set character codes and Source Coded Character Set character codes. Because of this, both Source-to-Destination and Destination-to-Source Coded Character Set conversions may be necessary depending upon the coded character sets supported by the input/output hardware attached to the Data Processing System 10. If the Application Software 12 is required to provide as output Source Coded Character Set character codes (e.g., to a printer supporting the ISO 646 German Coded Character Set), the Intermediate Coded Character Set Support Software 18 must be invoked to convert any Destination Coded Character Set character codes which are read from the Data File to the appropriate Source Coded Character Set character codes.

Usage of the Destination Coded Character Set instead of the Intermediate Coded Character Set begins at Step 110. Before usage of the Intermediate Coded Character Set, and therefore the Intermediate Coded Character Set Support Software 18, may be abandoned, it must be certain that the Data File 14 contains only Destination Coded Character Set character codes and that there are no data input or output devices using the Source Coded Character Set. The steps by which it is certified that the Data File contains only Destination Coded Character Set character codes will vary according to the Application Software. For some applications it may be acceptable to mark the various objects in the Data File as either Source or Destination. For other applications, there may be a background process that converts the character codes in the Data File while the Application Software is still active. After it is known that the Data File contains only Destination Coded Character Set character codes, the Application Software may be modified to eliminate its usage of the Intermediate Coded Character Set Support Software 18, thereby resulting in a complete migration to the Destination Coded Character Set.

FIG. 6 is an exemplary Form Map Table that is used for the exemplary Intermediate Coded Character Set. Each row in the table contains three entries: (1) an octal character code from the Source Coded Character Set, (2) an octal character code from the Destination Coded Character Set, and (3) the character symbol which is associated with the character codes in the first and second columns. The Source character codes include the ISO 646 character codes from the Intermediate Coded Character Set and the Destination character codes are include the ISO 8859.1 character codes from the Intermediate Coded Character Set.

For many of the character symbols in the exemplary Form Map Table, the Source character code is the same as the Destination character code. However, note that the character symbols Ä, Ö, Ü, ä, ö, ü, β have different Source and Destination character codes because they are represented by different character codes in the ISO 646 German Coded Character Set and the ISO 8859.1 Coded Character Set. This is because these character symbols are represented by two character codes in the Intermediate Coded Character Set.

The character string "süβ" is used as an example for using the Form Map Table. If the character string "süβ" is read from the Data File 14 and consists of the character codes: $163_8$, $175_8$, and $176_8$, and the desired output device supports the ISO 8859.1 Coded Character Set, the proper ISO 8859.1 character codes must be provided as output. To obtain the proper character codes, the Application Software 12 invokes the Intermediate Coded Character Set Support Software 18 and provides as input parameters the character codes and the desired coded character set. The Intermediate Coded Character Set Support Software seeks the character code $163_8$ in the Source column of the Form Map Table, and the corresponding character code (i.e., $163_8$) from the Destination column is provided as output. Similar processing is performed for the character codes $175_8$ and $176_8$, thereby resulting in the entire character string being encoded under the ISO 8859.1 Coded Character Set as $163_8$ $374_8$ $337_8$.

As noted above, the Data File 14 may include character codes encoded under either the Source Coded Character Set or the Destination Coded Character Set. Therefore, Destination Coded Character Set character codes may be required to be provided as Source Coded Character Set Character Codes. ISO 8859.1 Coded Character Set character codes that are read from the Data File could be converted to the ISO 646 German Coded Character Set by using the exemplary Form Map Table of FIG. 5. It should be recognized that irrespective of the particular character codes that represent the string "süβ" in the Data File 14 (e.g., ISO 646 German, ISO 8859.1, or a combination of each), the Form Map Table of FIG. 5 as defined by the Intermediate Coded Character Set can be used in making any required conversions.

The Form Map Table facilitates any required conversion, even if it is unknown whether the character code read from the Data File 14 is a Source Coded Character Set character code or a Destination Coded Character Set character code. Using the example character string as represented by the character codes $163_8$ $374_8$ and $176_8$, wherein the string is to be converted to the Destination Coded Character Set, it can be seen that the character code $163_8$ is present in the Source column and has a corresponding character code in the Destination column in the Form Map Table. For the character code $374_8$, it is not present in the Source column of the Form Map Table, therefore it is already encoded under the Destination Coded Character Set and does not need to be converted. The character code $176_8$ is present in the Source column of the Form Map Table and the corresponding character code (i.e., $337_8$) in the Destination column may be provided as output. The Form Map Table thereby allows the Data File to contain character codes from both the Source Coded Character Set and the Destination Coiled Character Set, as limited by the Intermediate Coded Character Set.

Figure 7:
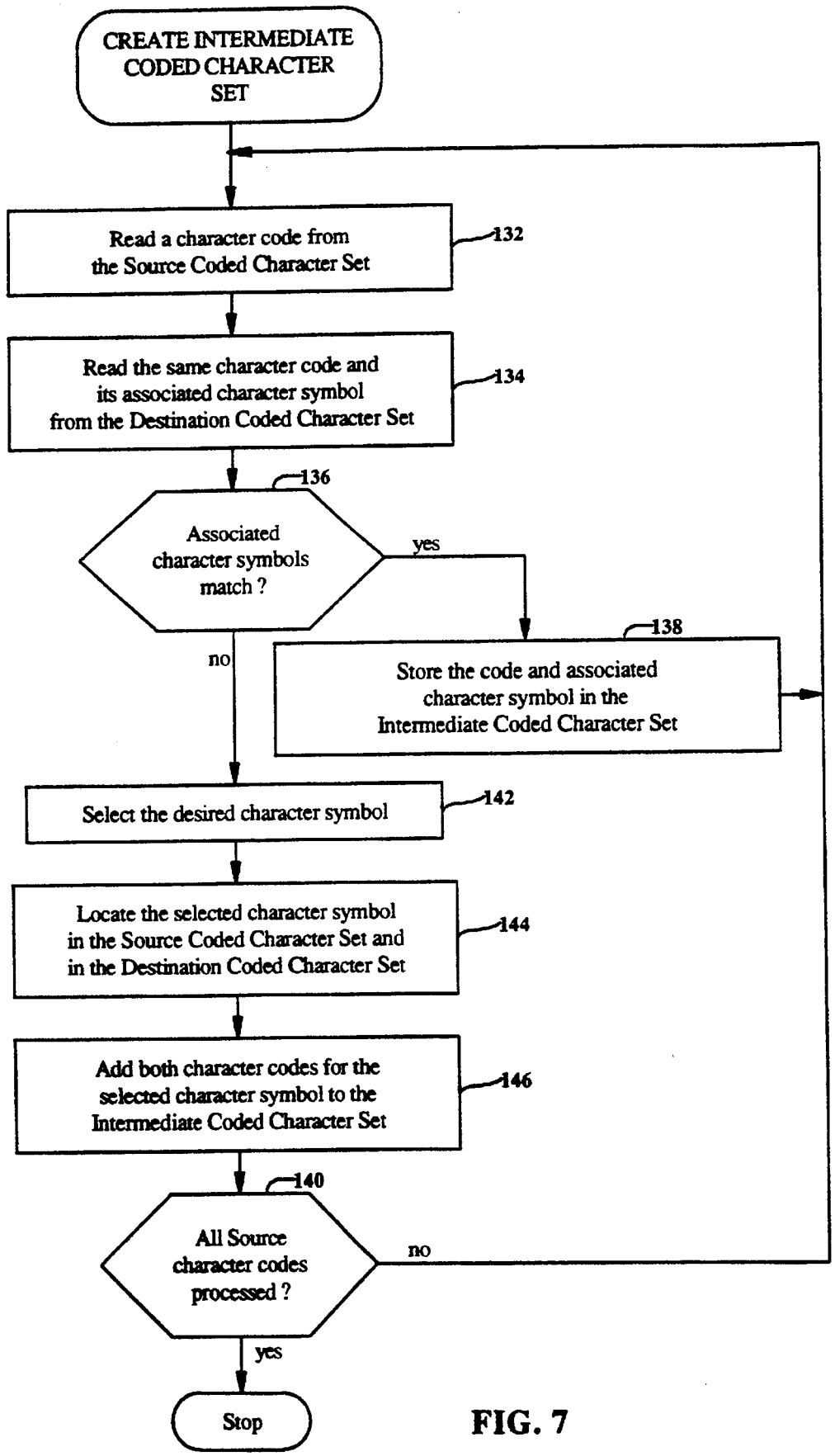
FIG. 7 is a flowchart of the processing for creating an Intermediate Coded Character Set.

FIG. 7 is a flowchart of the processing for creating an Intermediate Coded Character Set. Before an Intermediate Coded Character Set is created, the Source and Destination Coded Character Sets must be chosen. Continuing with the present example, the Source Coded Character Set is the ISO 646 German Coded Character Set and the Destination Coded Character Set is the ISO 8859.1 Coded Character Set. The character codes and associated character symbols of the Source Coded Character Set are compared against the codes and symbols of the Destination Coded Character Set. For character codes whose character symbols do not match, the alphabetic symbols are chosen over non-alphabetic symbols for inclusion in the Intermediate Coded Character Set. For example, the differences between symbols in ISO 646 and ISO 8859.1 (for character codes less than or equal to $176_8$) are:

| ISO 646    | § | Ä | Ö | Ü | ä | ö | ü | β |
|------------|---|---|---|---|---|---|---|---|
| ISO 8859.1 | @ | [ | \ | ] | { | \| | } | ~ |

The symbols Ä, Ö, Ü, ä, ö, ü, and β are chosen for inclusion in the Intermediate Coded Character set. If the application of this invention is primarily to support the correct representation of people and place names, the § symbol may be ignored because it is not used to represent names. If the application did require the § symbol then the § would have to be included in the Intermediate Coded Character Set.

As with the Source Coded Character Set and the Destination Coded Character Set, the Intermediate Coded Character Set allows sorting, collating, and comparison of character strings using the table driven technique outlined in the *Canadian Alphanumeric Ordering Standard for Character Sets of CSA Z243.4 Standard, Z243.1-1990*, ed. Alain LaBonté, Canadian Standards Association, 13 Sep., 1991.

At Step 132 a character code/character symbol pair is read from the Source Coded Character Set. The same character code and its associated character symbol are read from the Destination Coded Character Set at Step 134. If the character symbols read at Steps 132 and 134 are the same, decision Step 136 directs control to Step 138. Step 138 stores the character code and the character symbol in the Intermediate Coded Character Set and control is directed to decision Step 140 to determine whether there are any remaining character codes in the Source Coded Character set to process. If there are more character codes to process, control is returned to Step 132 to read the next character code. Otherwise, the process of creating the Intermediate Coded Character Set is complete.

If decision Step 136 finds that the character symbols from Steps 132 and 134 do not match, control is directed to Step 142. Step 142 selects the character symbol to include in the Intermediate Coded Character Set. As in the example above, if the character code/character symbol pair $133_8$/Ä is read from the Source Coded Character Set (ISO 646), it would be included in the Intermediate Coded Character Set rather than the corresponding pair, $133_8$/], from the Destination Coded Character Set (ISO 8859.1).

Step 144 locates the character symbol selected at Step 142 in both the Source and Destination Coded Character Sets, and Step 146 adds both character codes and the selected character symbol to the Intermediate Coded Character Set. Continuing with the present example, the $133_8$/Ä and the $304_8$/Ä code/symbol pairs are added to the Intermediate Coded Character Set. Processing then continues at decision Step 140 as described above.

Figure 8:
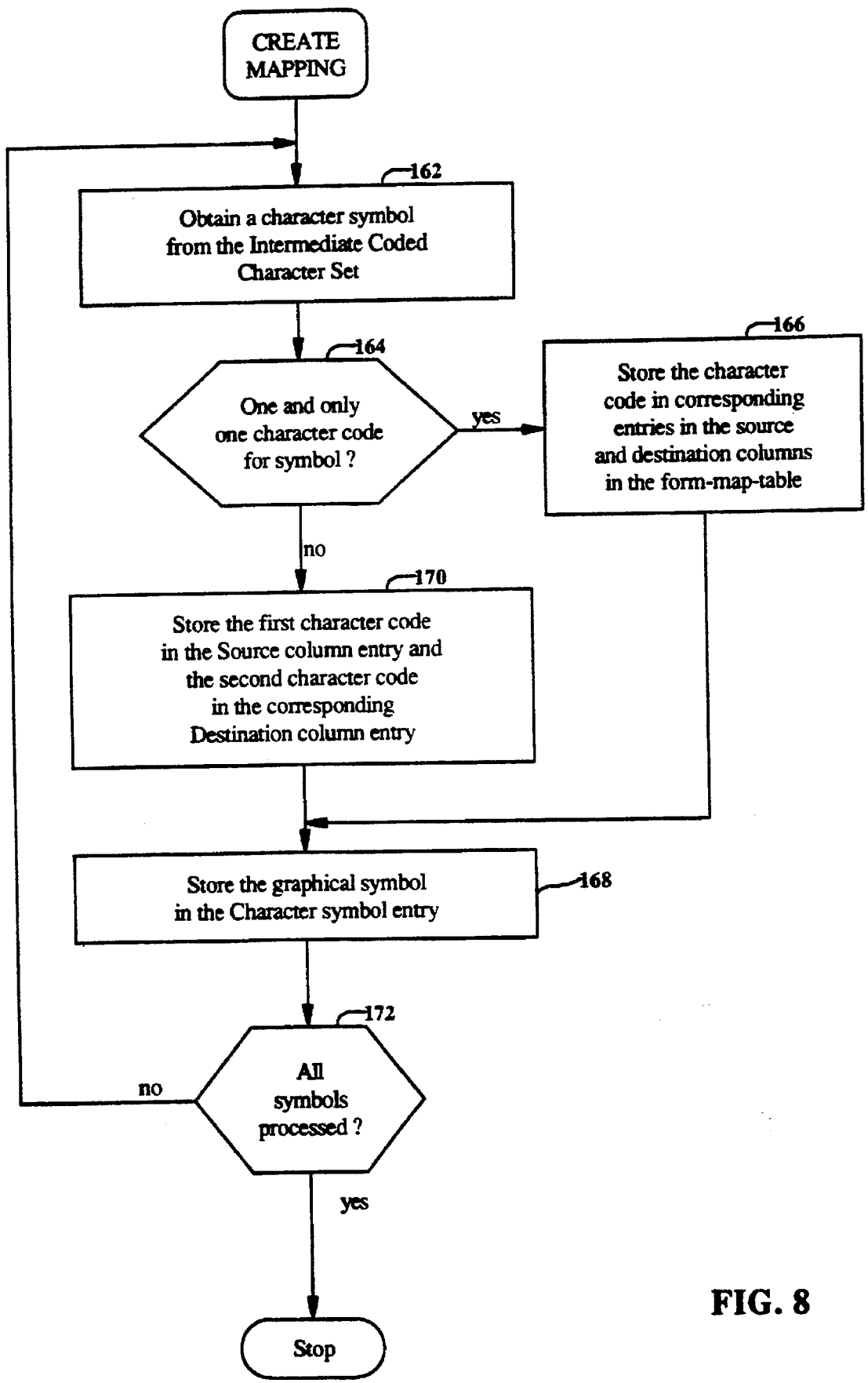
FIG. 8 is a flowchart of the processing for creating a mapping between the character codes and character symbols in the Intermediate Coded Character Set.

FIG. 8 is a flowchart of the processing for creating a mapping between the character codes and character symbols in the Intermediate Coded Character Set. The mapping is accomplished with the Form Map Table of FIG. 6. The processing of FIG. 8 creates the Form Map Table.

Step 162 reads a character code/character symbol pair from the Intermediate Coded Character Set. If decision Step 164 finds that the character symbol read at Step 162 is only represented by one character code in the Intermediate Coded Character Set, control is directed to Step 166. Step 166 constructs a row in the From Map Table, and in particular, stores the character code from Step 162 in both the Source and Destination entries. Processing proceeds to Step 168 where the character symbol from Step 162 is stored in the Form Map Table.

If decision Step 164 finds that the character symbol from Step 162 is represented by two character codes in the Intermediate Coded Character Set, control is directed to Step 170. Step 170 stores the character code from the Source Coded Character Set in the Source column of the Form Map Table of FIG. 6 and the character code from the Destination Coded Character Set in the Destination column. Processing then proceeds to Step 168 where the associated character symbol is stored in the symbol column.

Step 172 tests whether all the character symbols in the Intermediate Coded Character Set have been processed. If there are more symbols to process, control is returned to Step 162 to begin processing another symbol. Otherwise, the process for creating the mapping between source and destination character codes is complete.

Figure 9:
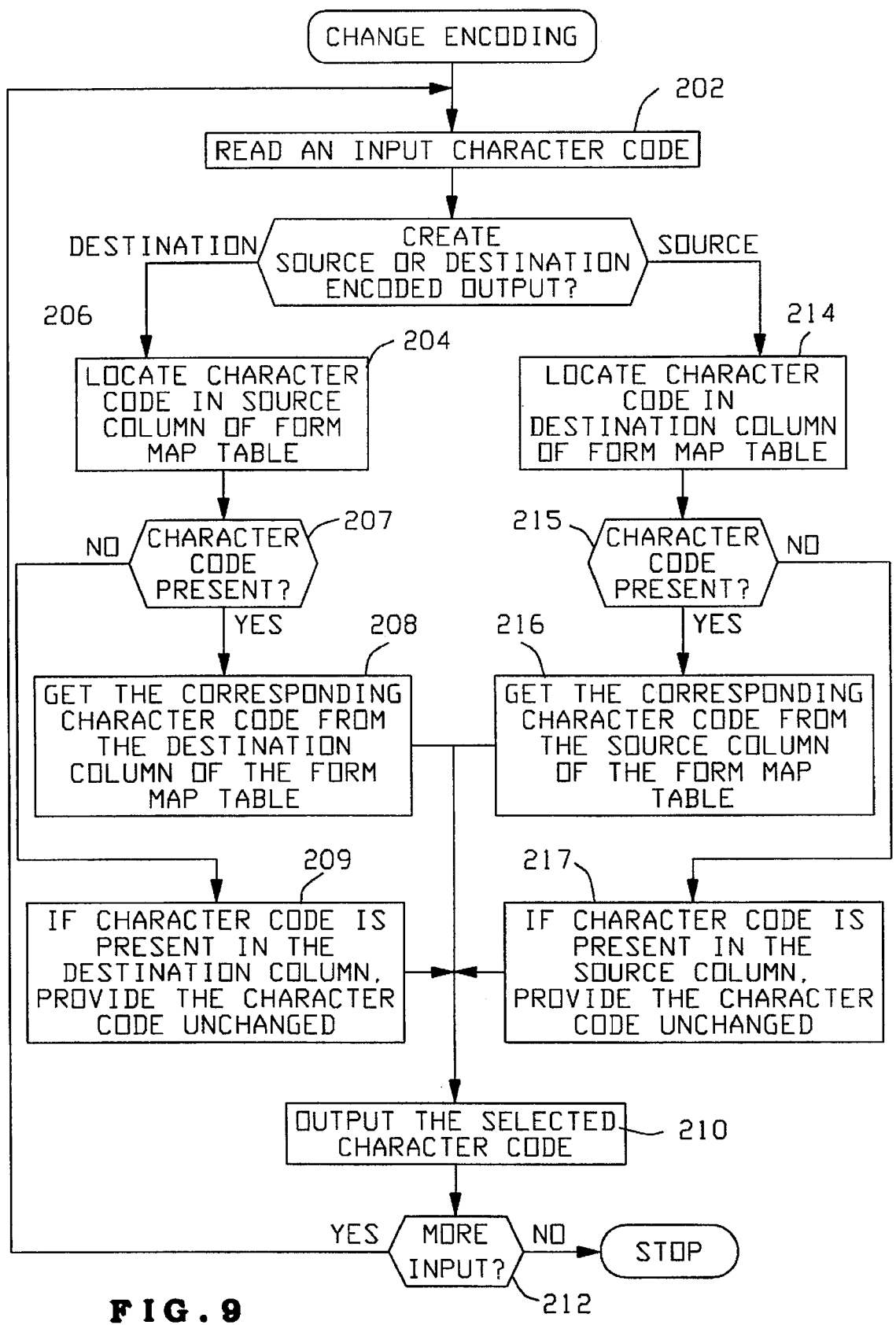
FIG. 9 is a flowchart of the processing of the Change Encoding processing of the Intermediate Coded Character Set Support Software for changing the encoding of character codes to a selected coded character set.

FIG. 9 is a flowchart of the processing of the Change Encoding processing of the Intermediate Coded Character Set Support Software 18 for changing the encoding of character codes to a selected coded character set. Step 202 reads a character code that is provided as input to the Intermediate Coded Character Set Support Software processing and decision Step 204 determines the desired encoding, either the Source Coded Character Set or the Destination Coded Character Set. Note that the Form Map Table may be used to obtain the desired encoding.

The desired encoding depends upon the requirements of the Application Software. For example, if character codes are read from a Data File 14 and the data is to be output to an output device which supports ISO 8859.1, the required encoding is ISO 8859.1 (the Destination in the From Map Table of FIG. 6). On the other hand, if the Data Processing System 10 still has hardware that expects character codes encoded under the Source Coded Character Set, the character codes that are read from the Data File must be encoded under the Source Coded Character Set if they are to be output to such hardware.

Because a gradual migration of character codes in the Data File to the Destination Coded Character Set is desired, if Application Software 12 receives character codes from an input device which encodes character symbols using ISO 8859.1, the character codes are written directly to the Data File. If Application Software receives character codes from an input device which encodes characters using ISO 646 German, the character codes may be converted to ISO 8859.1 and then written to the Data File. Thus, over time, the character codes in the Data File may be gradually converted from ISO 646 German to ISO 8859.1.

If the required encoding is under the Destination Coded Character Set, control is directed to Step 206 where the character code from Step 202 is sought in the Source column in the Form Map Table of FIG. 6. If the character code is present in the Source column, decision Step 207 directs control to Step 208. Step 208 obtains the character code from the Destination column in the Form Map Table that corresponds to the Form Map Table entry found at Step 206. If the character code is not found in the Source column of the Form Map Table, decision Step 207 directs control to Step 209. The character code would not be present in the Source column if it is a code that is already encoded under the Destination Coded Character Set and is unique to the Destination Coded Character Set. Step 209 provides the character code as output if it is found in the Destination column. A character code found in neither the Source nor the Destination column represents an error condition because the character code is not a member of the Intermediate Coded Character Set.

The character code obtained at either Step 109 or Step 208 is used as the output character code at Step 210. Decision Step 212 tests whether there are any more character codes to encode under the selected coded character set. If there are more character codes, such as for a string of characters, control is directed to Step 202 to process the next character code. Otherwise, the Change Encoding processing is complete.

If decision Step 204 determines that the desired encoding is the Source (ISO 646 German), control is directed to Step 214. Step 214 searches for the character code of Step 202 in the Destination column in the Form Map Table of FIG. 6. If the character code is present in the Destination column, decision Step 215 directs control to Step 216 where the corresponding character code from the Source column in the Form Map Table is obtained. If the character code of Step 202 is not found in the Destination column of the Form Map Table, then the character code may already be in encoded in the Source Coded Character Set and decision Step 215 directs control to Step 217. Step 217 provides the character code of Step 202 as output if it is found in the Source column of the Form Map Table. If the character code of Step 202 is neither in the Source nor the Destination column, an error condition has occurred because the character code is not a member of the Intermediate Coded Character Set. Processing then proceeds to Step 210 as described above.

Computer system users must consider the coded character set supported by their existing equipment and the coded character set supported by any new equipment they seek to install in their system. For computer system users who cannot not afford to be without their systems, the present invention supports continued use of existing equipment, software and data supporting a first coded character set, along with equipment and software which supports a second coded character set, while data is gradually migrated to the desired coded character set.

Having described an exemplary embodiment of the invention in the drawings and accompanying description, those skilled in the art will recognize that various modifications to the exemplary embodiment could be made without departing from the scope and spirit of the claims set forth below:

That which is claimed is:

1. In a data processing system for providing access to a data file, wherein the data file initially contains character codes encoded under a first coded-character-set, a computer implemented method for gradually transliterating character codes in the data file to a second coded-character-set, wherein the first coded-character-set consists of a first set of character code/character symbol pairs and the second coded-character-set consists of a second set of character code/character symbol pairs, the method comprising the steps of:

(a) creating an intermediate coded-character-set, wherein said intermediate coded-character-set includes predetermined first coded-character-set character code/character symbol pairs and predetermined second coded-character-set character code/character symbol pairs, wherein each of said predetermined second coded-character-set character code/character symbol pairs has a character symbol that is in one of said predetermined first coded-character-set character code/character symbol pairs and the associated character code from the second coded-character-set is not equal to the first coded-character-set character code associated with the character symbol, whereby the character symbols in said predetermined second coded-character-set character code/character symbol pairs are represented by two character codes in said intermediate-coded-character-set;

(b) writing said second coded-character-set input character codes without change in the data file for second coded-character-set input character codes that are to be written in the data file, whereby the data file may contain character codes encoded under the first coded-character-set and character codes encoded under the second coded-character-set; and (c) selectively transliterating first coded-character-set character codes that are read from the data file for output using said intermediate-coded-character-set, to second coded-character-set character codes when second coded-character-set character codes are required for output.

2. The method of claim 1, further including the step of (d) discontinuing usage of said intermediate coded-character-set and commencing usage of the second coded-character-set when all character codes in the data file are encoded under the second coded-character-set.

3. The method of claim 1, further including the steps of:

(e) transliterating said first coded-character-set input character codes to second coded-character-set input character codes using said intermediate coded-character-set for first coded character set input character codes that are to be written in the data file; and (f) writing said second coded-character-set input character codes in the data file.

4. The method of claim 1, further including the step of (g) selectively transliterating second coded-character-set character codes that are read from the data file for output, using said intermediate coded-character-set, to first coded-character-set character codes when first coded-character-set character codes are required for output.

5. The method of claim 1, further including the steps of (h) designating character code/character symbol pairs as first coded-character-set pairs in said intermediate coded-character-set for character code/character symbol pairs from the first coded-character-set for which the character symbol is represented by a different character code in the second coded-character-set;

(i) designating said predetermined second coded-character-set character code/character symbol pairs as second coded-character-set pairs in said intermediate-coded-character-set.

6. The method of claim 1, wherein said creating an intermediate coded-character-set step includes the steps of, (j) reading a first character code/character symbol pair from the first coded-character-set;

(k) reading a second character code/character symbol pair from the second coded-character-set, wherein said second character code/character symbol pair has a character code which is equal to the character code from said first character code/character symbol pair;

(l) if the character symbol in said first character code/character symbol pair is the same as the character symbol in said second character code/character symbol pair, adding said first character code/character symbol pair to said intermediate coded-character-set;

(m) if the character symbol in said first character code/character symbol pair is not the same as the character symbol in said second character code/character symbol pair, performing steps (n) through (p);

(n) selecting a predetermined character code/character symbol pair from said first character code/character symbol pair and said second character code/character symbol pair (o) adding said predetermined character code/character symbol pair to said intermediate coded-character-set;

(p) adding a second character code/character symbol pair to said intermediate coded-character-set, wherein the character symbol of said second character code/character symbol pair is equal to the character symbol of said predetermined character code/character symbol pair and said second character code/character symbol pair is equal to a pair from the coded character set from which said predetermined character code/character symbol pair was not selected; and (q) repeating steps (n) through (p) until all character code/character symbol pairs in the first coded-character-set have been processed.

7. The method of claim 1, further including the steps of, (j) creating a form map table having a first column in which each entry contains a character code from the first coded-character-set, a second column in which each entry contains a character code from the second coded-character-set which corresponds to a character code from the first coded-character-set, and a third column in which entry contains a character symbol which is represented by a corresponding first column entry and a corresponding second column entry, wherein said creating step includes the steps of (k) selecting a first character code/character symbol pair from said intermediate coded-character-set;

(l) storing the character code from said first character code/character symbol pair in a first column entry and a corresponding second column entry of said form map table if the character symbol of said first character code/character symbol pair appears only once in said intermediate coded-character-set; and (m) if a character symbol is included twice in said intermediate coded-character-set, storing the character code from the character code/character symbol pair from the first coded-character-set in an entry in said first column and the character code from the character code/character symbol pair from the second coded-character-set in said second column entry; and (n) repeating steps (k) through (m) until all character code/character symbol pairs in said intermediate coded-character-set have been processed.

8. In a data processing system for providing access to a data file, wherein the data file initially contains character codes encoded under a first coded-character-set, a computer implemented method for gradually transliterating character codes in the data file to a second coded-character-set, wherein the first coded-character-set consists of a first set of character code/character symbol pairs and the second coded-character-set consists of a second set of character code/character symbol pairs, the method comprising the steps of:

(a) creating an intermediate coded-character-set, wherein said intermediate coded-character-set is comprised of predetermined first coded-character-set character code/character symbol pairs and predetermined second coded-character-set character code/character symbol pairs, wherein said predetermined second coded-character-set character code/character symbol pairs have a character symbol which is in one of said predetermined first coded-character-set character code/character symbol pairs and the associated character code from the second coded-character-set is not equal to the first coded-character-set character code associated with the character symbol, whereby the character symbols in said second coded-character-set character code/character symbol pairs are represented by two character codes in said intermediate coded-character-set;

(b) creating a form map table having a first column in which each entry contains a character code from the first coded-character-set, a second column in which each entry contains a character code from the second coded-character-set which corresponds to a character code from the first coded-character-set, and a third column in which entry contains a character symbol which is represented by a corresponding first column entry and a corresponding second column entry, wherein said creating step includes the steps of (c) through (f);

(c) selecting a first character code/character symbol pair from said intermediate coded-character-set;

(d) storing the character code from said first character code/character symbol pair in a first column entry and a corresponding second column entry of said form map table if the character symbol of said first character code/character symbol pair appears only once in said intermediate coded-character-set; and (e) if a character symbol is included twice in said intermediate coded-character-set, storing the character code from the character code/character symbol pair from the first coded-character-set in an entry in said first column and the character code from the character code/character symbol pair from the second coded-character-set in said second column entry; and (f) repeating steps (c) through (e) until all character code/character symbol pairs in said intermediate-coded-character-set have been processed;

(g) writing said second coded-character-set input character codes without change in the data file for second coded-character-set input character codes that are to be written in the data file, whereby the data file may contain character codes encoded under the first coded-character-set and character codes encoded under the second coded-character-set;

(h) reading a first character code from the data file, wherein said first character code may be encoded under either the first coded-character-set or the second coded-character-set;

(i) selecting the second coded-character-set for encoding for output said first character code;

(j) searching for said first character code in a first entry in said first column in said form map table;

(k) providing as output the character code from a second entry in said second column that corresponds to said first entry in said form map table if said first character code is located at said searching step (j);

(l) providing as output said first character code if said first character code is not located at said searching step (j); and (m) discontinuing usage of said intermediate coded-character-set and commencing usage of the second coded-character-set when all character codes in the data file are encoded under the second coded-character-set.

9. The method of claim 8, further including the steps of:

(n) reading a second character code from the data file, wherein said second character code may be encoded under either the first coded-character-set or the second coded-character-set;

(o) selecting the first coded-character-set for encoding for output said second character code;

(p) searching for said second character code in a third entry in said second column in said form map table;

(q) providing as output the character code from a fourth entry in said first column that corresponds to said third entry in said form map table if said second character code is located at said searching step (p); and (r) providing as output said second character code if said second character code is not located at said searching step (p).

10. The method of claim 8, further including the steps of (s) through (t) for first coded-character-set input character codes that are to be written in the data file, (s) searching for said first coded-character-set input character code in a fifth entry in said first column in said form map table; and (t) writing in the data file the character code from a sixth entry in said second column that corresponds to said fifth entry in said form map table.

11. In a data processing system having data access control for reading character codes from and writing character codes to a data file, wherein the data file initially contains character codes encoded under a first coded-character-set, an apparatus for gradually transliterating character codes in the data file to a second coded-character-set, wherein the first coded-character-set consists of a first set of character code/character symbol pairs and the second coded-character-set consists of a second set of character code/character symbol pairs, the apparatus comprising:

creation means for creating an intermediate coded-character-set, wherein said intermediate coded-character-set is comprised of predetermined first coded-character-set character code/character symbol pairs and predetermined second coded-character-set character code/character symbol pairs, wherein each of said predetermined second coded-character-set character code/character symbol pairs has a character symbol that is in one of said predetermined first coded-character-set character code/character symbol pairs and the associated character code from the second coded-character-set is not equal to the first coded-character-set character code associated with the character symbol, whereby the character symbols in said predetermined second coded-character-set character code/character symbol pairs are represented by two character codes in said intermediate coded-character-set;

write means responsive to the data access control for writing in the data file second coded-character-set input character codes that are to be written in the data file, whereby the data file may contain character codes encoded under the first coded-character-set and character codes encoded under the second coded-character-set;

first transliteration means interfaced with the data access control and said intermediate coded-character-set for transliterating first coded-character-set character codes that are read from the data file for output, to second coded-character-set character codes when second coded-character-set character codes are required for output.

12. The apparatus of claim 11, further comprising second transliteration means interfaced with the data access control and said intermediate coded-character-set for transliterating first coded-character-set character codes that are to be written to the data file to second coded-character-set character codes using said intermediate coded-character-set and providing said second coded-character-set character codes to the data access control.

13. The apparatus of claim 11, further comprising third transliteration means interfaced with the data access control and said intermediate coded-character-set for transliterating second coded-character-set character codes that are read from the data file by the data access control to first coded-character-set character codes and providing said first coded-character-set character codes to the data access control.

14. The apparatus of claim 11, further comprising designation means interfaced with said intermediate coded-character-set for designating character code/character symbol pairs as first coded-character-set pairs in said intermediate coded-character-set for character code/character symbol pairs from the first coded-character-set for which the character symbol is represented by a different character code in the second coded-character-set, and for designating said predetermined second coded-character-set character code/character symbol pairs as second coded-character-set pairs in said intermediate coded-character-set.

* * * * *